Sept. 17, 1968 R. A. BUB 3,401,803
FILTER FORMED FROM CORRUGATED AND FLAT SHEETS
Filed Dec. 6, 1965 2 Sheets-Sheet 1

INVENTOR.
ROBERT A. BUB
BY
Brown, Critchlow, Flick & Peckham
ATTORNEYS.

Sept. 17, 1968 R. A. BUB 3,401,803
FILTER FORMED FROM CORRUGATED AND FLAT SHEETS
Filed Dec. 6, 1965 2 Sheets-Sheet 2

INVENTOR.
ROBERT A. BUB
BY
Brown, Critchlow, Flick & Peckham
ATTORNEYS.

3,401,803
FILTER FORMED FROM CORRUGATED
AND FLAT SHEETS
Robert A. Bub, Gibsonia, Pa., assignor to Mine Safety
Appliances Company, a corporation of Pennsylvania
Filed Dec. 6, 1965, Ser. No. 511,737
6 Claims. (Cl. 210—488)

ABSTRACT OF THE DISCLOSURE

A filter body is assembled from a stack of filter units, each of which is formed from flat filtering sheets attached to opposite sides of corrugated filtering sheets. Each corrugated sheet forms between the adjoining flat sheets two groups of parallel passages, with the ends of the passages in one group closed at one edge of the sheet and the ends of the passages in the other group closed at the opposite edge of the sheet. The top and bottom flat sheets of each unit extend lengthwise of the passages only part way across the unit, and the two flat sheets between each pair of filter units overlap only along their inner marginal areas.

---

This invention relates to filters of the type in which flat filtering sheets are separated by corrugated or zigzag filtering sheets.

It is among the objects of this invention to provide a filter body which is formed from a stack of filter units, each including a corrugated sheet between flat sheets, and which can be produced by cutting a filter element of any length transversely at predetermined intervals to form the filter units for stacking upon one another.

In accordance with this invention the filter body includes flat filtering sheets attached to opposite sides of corrugated filtering sheets, resulting in each corrugated sheet forming two groups of parallel passages between the adjoining flat sheets. The ends of the passages in one group are closed at one edge of the corrugated sheet, while the ends of the passages in the other group are closed at the opposite edge of the corrugated sheet. The top and bottom flat sheets of each filter unit extend only part way across the unit. Consequently, by stacking the filter units in such a way that adjacent corrugated sheets will be completely separated by flat sheets, the two flat sheets between each pair of units will have overlapping inner marginal areas that can be interlocked if desired. Preferably, the top and bottom flat sheets of each filter unit extend inwardly from opposite edges of that unit so that a plurality of these filter units cut from a long strip can be stacked on one another in proper relation without reversing alternate units.

The preferred embodiment of the invention is illustrated in the accompanying drawings, in which FIG. 1 is a fragmentary perspective view of a filter unit;

Figure 1:
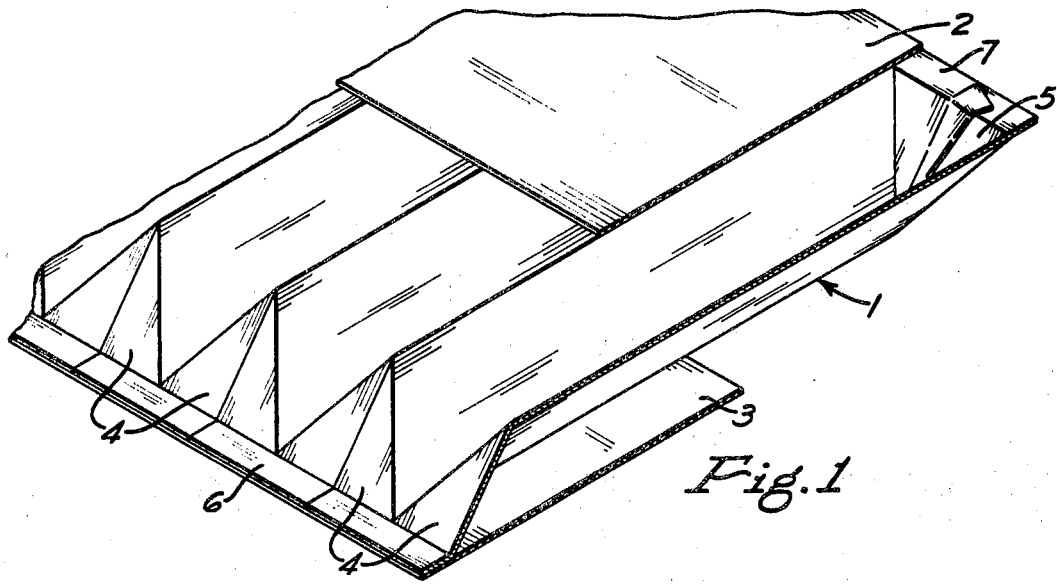

Referring to FIG. 1 of the drawings, a filter unit is formed from three parts, a corrugated or zigzag filtering sheet 1 and two flat sheets 2 and 3. The sheets generally will be longer than they are wide, in which case the corrugations extend across the narrow width of the sheets. The flat sheets are attached to the opposite sides of the corrugated sheet, thereby forming two groups of parallel passages. The passages shown have three sides. One group is formed between the top flat sheet and the corrugated sheet, and the other group is formed between the bottom flat sheet and the corrugated sheet. For best results, the flat sheets are attached to the opposite edges only of the corrugated sheet, because it is easier and in such an arrangement the flat sheets help to hold ends of the passages or troughs betwen the corrugations closed. The inner edges of the flat sheets are not attached to the corrugated sheet.

Only one end of each passage is closed. The ends 4 of all of the passages in one group are closed at one edge of the corrugated sheet, while the ends 5 of all of the passages in the other group are closed at the opposite edge of the corrugated sheet. The ends of the passages may be closed in various ways, but a convenient way of doing so is to fold the end portions of the sloping sides of a passage back into the passage into engagement with each other and then crush their outer portions 6 and 7 against the adjoining flat sheet and fasten them there by means of adhesive or mechanical means. The flat sheets therefore hold the ends of the passages closed and are attached to the opposite edges of the corrugated sheet. Each of the flat sheets extends inwardly across the corrugated sheet only part way for a purpose that will appear presently.

Figure 2:
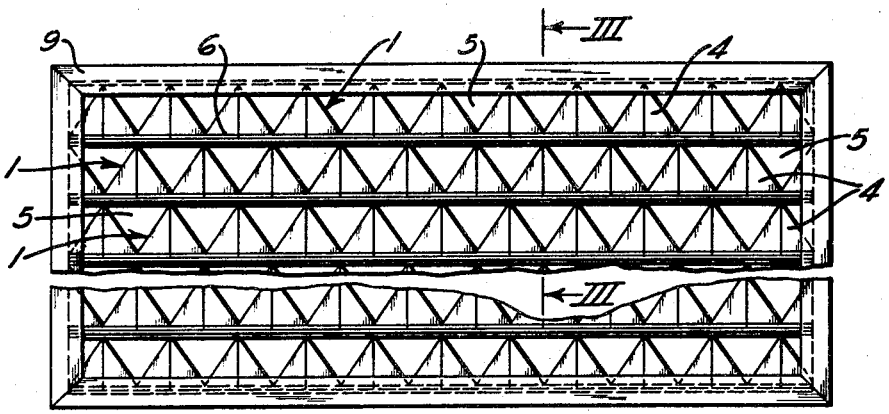
FIG. 2 is a reduced fragmentary end view of a filter formed from a stack of the filter units.
Figure 3:
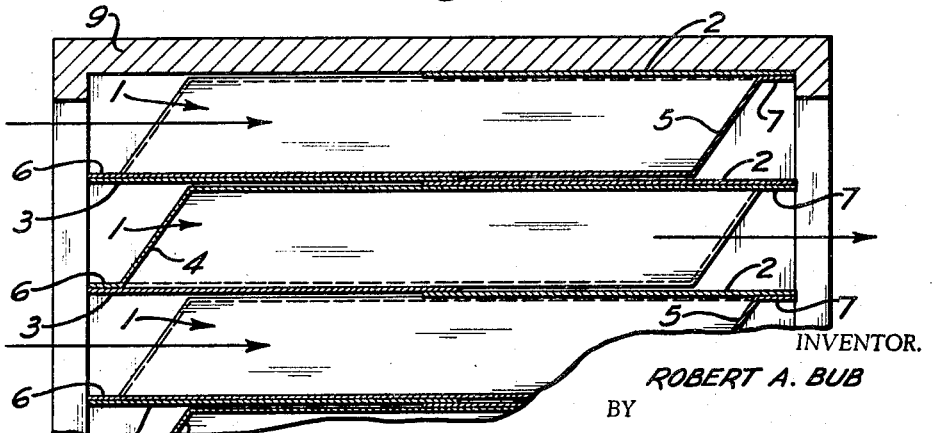
FIG. 3 is an enlarged section of the filter taken on the line III—III of FIG. 2.

This filter unit can be formed from sheets that previously have been cut to the desired length, but it is preferred to cut the unit bodily from a much longer filter element having the same construction. Such a filter element can be formed from strips of any length fed into a machine where they are assembled and from which the finished element issues continuously. At predetermined intervals this element is severed transversely to separate from it is filter units in succession. This filter units generally will all have the same length. To form a filter body from them, they are stacked upon one another as shown in FIG. 2. This can be done without reversing alternate units, because the bottom flat sheet 3 of each unit is wide enough to cover the previously uncovered upper portion of the corrugated sheet in the unit below it, as shown in FIG. 3. Due to the fact that the inner edges of the flat sheets extend past each other a short distance, the inner edges of the two flat sheets between each pair of corrugated sheets will overlap slightly so that there will be no leakage between the inner edges of those sheets. If desired, the adjoining edges of the flat sheets can be interlocked. By having only a narrow overlapping area, the corrugated sheets are separated for the most part by only a single layer of flat sheet. Consequently, fluid passing through the walls of the filter passages is filtered through only one layer, no matter which wall the fluid flows through. It is preferred that each flat sheet extend slightly more than half way across the corrugated sheet, so all flat sheets can be the same width.

If both flat sheets extended inwardly from the same edge of the corrugated sheet, other means would have to be found for helping to close the passages at the opposite edge of the sheet and there would also be a problem in attaching one of the flat sheets to the corrugated sheet. Furthermore, alternate units would have to be reversed as they are stacked, in order to have only the inner edges of adjoining flat sheets overlap. Therefore, the construction illustrated in the drawings is preferred.

The filter body formed as illustrated herein is sealed in a suitable frame 9 that is open at opposite ends so that fluid can flow into the filter body through the open ends of the passages at one end of the filter, then pass through the walls of those passages into the other group of passages, and then out of the opposite end of the filter through the open ends of the second group of passages.

Figure 4:
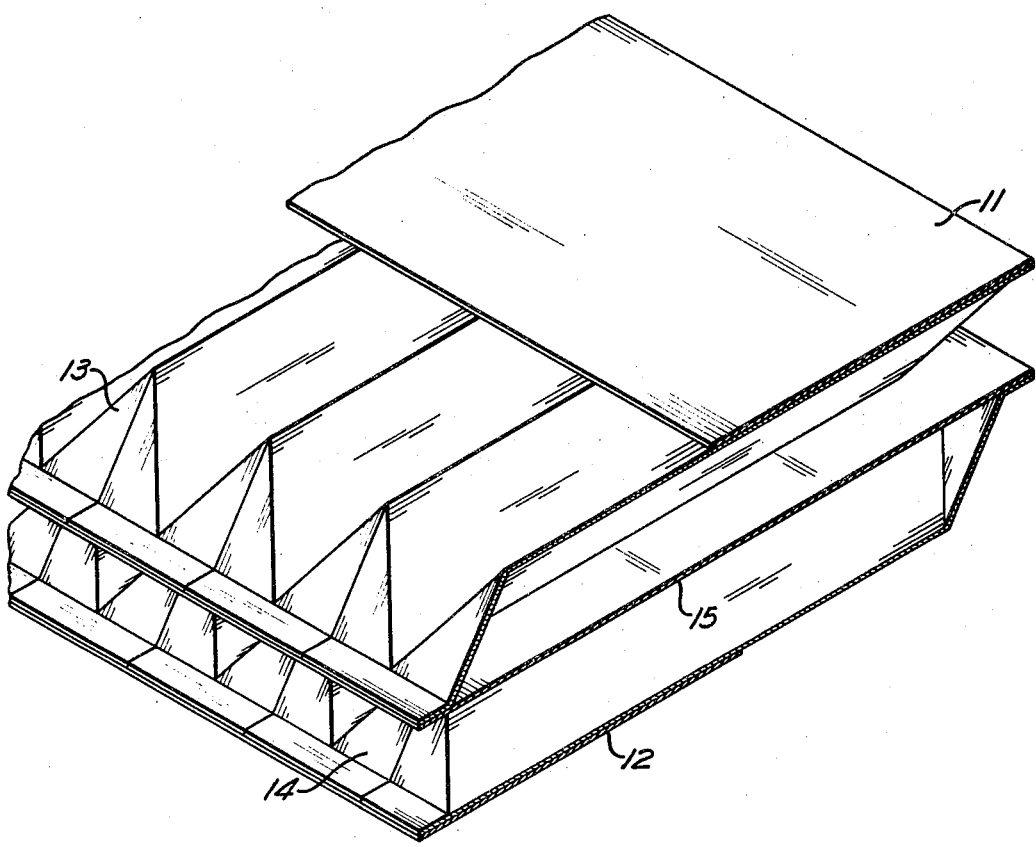
FIG. 4 is a view similar to FIG. 1, but of a modification.

In the modification shown in FIG. 4, a filter unit again has a relatively narrow top flat sheet 11 and a similar bottom sheet 12, but instead of there being only a single corrugated sheet between them, there are two superimposed corrugated sheets 13 and 14 separated by a flat sheet 15 that extends substantially the full width of the unit. The top flat sheet is secured to one edge of corrugated sheet 13 and the wide middle flat sheet 15 is secured to the opposite edge of the same corrugated sheet. The opposite edge of the middle sheet is fastened to one edge of the other corrugated sheet. The opposite edge of corrugated sheet 14 is attached to the bottom flat sheet. These units can be stacked in a frame in the same way as those first described, and there will be two groups of passages formed by each corrugated sheet and the adjoining flat sheets, one group being closed at one end and the other group closed at the opposite end.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A filter body comprising a stack of separate filter units formed from separate flat filtering sheets attached to opposite sides of corrugated filtering sheets, each corrugated sheet forming two groups of parallel passages between the adjoining flat sheets, the ends of the passages in one group being closed at one edge of the corrugated sheet and open at the opposite edge of that sheet, and the ends of the passages in the other group being closed at said opposite edge of the corrugated sheet and open at said one edge, the top and bottom flat sheets of each filter unit extending from an edge thereof lengthwise of said passages only part way across the unit, and the two flat sheets between each pair of filter units in said stack having overlapping portions only along their inner marginal areas.

2. A filter body as defined in claim 1, in each filter unit of which there is only one corrugated sheet and two flat sheets.

3. A filter body as defined in claim 1, in each filter unit of which there is only one corrugated sheet and two flat sheets, and each flat sheet of a unit extends inwardly thereof from the closed ends of the passages it helps to form in that unit.

4. A filter body as defined in claim 1, in each filter unit of which there is only one corrugated sheet and two flat sheets, and each flat sheet of a unit extends inwardly slightly more than half way across the corrugated sheet from the closed ends of the passages it helps to form in that unit.

5. A filter body as defined in claim 1, in each filter unit of which there are two superimposed corrugated sheets with a single flat sheet between them extending substantially the full width thereof.

6. A filter element comprising a transversely corrugated filtering strip of indefinite length, and a separate flat filtering strip of substantially the same length attached to each side of the corrugated strip to form two groups of parallel passages betwen the flat strips and the corrugated strip, the ends of the passages in one group being open at one edge of the corrugated strip and being closed at the opposite edge of that strip by end walls having an integral laterally projecting flange extending lengthwise of the corrugated strip, and the ends of the passages in the other group being open at said opposite edge of the corrugated strip and being closed at said one edge of that strip by end walls having an integral laterally projecting flange extending lengthwise of the corrugated strip, one flat strip being attached to one of said flanges and the other flat strip being attached to the other flange, and the flat strips extending from said flanges inwardly only part way across the corrugated strip, said element being adapted to be cut transversely at predetermined intervals to form a plurality of filter units that can be stacked upon one another to form a filter body in which the corrugated sheets are separated by flat sheets having overlapping inner marginal areas.

References Cited
UNITED STATES PATENTS 2,980,208  4/1961  Neumann _____ 210—493 X
3,037,637  6/1962  Bub _____ 210—487
3,242,655  3/1966  Rivers _____ 210—493 X REUBEN FRIEDMAN, *Primary Examiner.*

J. ADEE, *Assistant Examiner.*